US010739622B2

(12) United States Patent
Roth et al.

(10) Patent No.: US 10,739,622 B2
(45) Date of Patent: Aug. 11, 2020

(54) INTEGRATED OPTOELECTRONIC DEVICE WITH HEATER

(71) Applicant: Juniper Networks, Inc., Sunnyvale, CA (US)

(72) Inventors: Jonathan Edgar Roth, San Francisco, CA (US); Erik Johan Norberg, Santa Barbara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/235,197

(22) Filed: Dec. 28, 2018

(65) Prior Publication Data

US 2020/0209655 A1 Jul. 2, 2020

(51) Int. Cl.
*G02F 1/025* (2006.01)
*G02F 1/017* (2006.01)
*G02F 1/015* (2006.01)

(52) U.S. Cl.
CPC .......... *G02F 1/01708* (2013.01); *G02F 1/025* (2013.01); *G02F 2001/0157* (2013.01); *G02F 2001/01791* (2013.01)

(58) Field of Classification Search
CPC combination set(s) only.
See application file for complete search history.

(56) References Cited

U.S. PATENT DOCUMENTS

| | | | |
|---|---|---|---|
| 6,665,105 B2 | 12/2003 | Wipiejewski | |
| 6,831,767 B2* | 12/2004 | Shigeta | B82Y 20/00 359/240 |
| 9,513,497 B2 | 12/2016 | Guzzon et al. | |
| 9,806,112 B1* | 10/2017 | Celo | H01L 27/1443 |
| 2012/0033284 A1* | 2/2012 | Fukuda | G02F 1/025 359/248 |
| 2015/0253510 A1* | 9/2015 | Celo | G02F 1/0147 385/14 |
| 2017/0082877 A1* | 3/2017 | Arimoto | G02F 1/2257 |
| 2018/0188632 A1 | 7/2018 | Celo et al. | |

OTHER PUBLICATIONS

"European Application Serial No. 19181590.1, Extended European Search Report dated Jan. 13, 2020", 6 pgs.

* cited by examiner

*Primary Examiner* — Eric Wong
(74) *Attorney, Agent, or Firm* — Schwegman Lundberg & Woessner, P.A.

(57) ABSTRACT

Disclosed are structures as well as methods of manufacture and operation of integrated optoelectronic devices that facilitate directly heating the diode or waveguide structures to regulate a temperature of the device while allowing electrical contacts to be placed close to the device to reduce the electrical resistance. Embodiments include, in particular, heterogeneous electro-absorption modulators that include a compound-semiconductor diode structure placed above a waveguide formed in the device layer of an SOI substrate.

15 Claims, 9 Drawing Sheets

INTEGRATED OPTOELECTRONIC DEVICE WITH HEATER

TECHNICAL FIELD

This disclosure relates generally to integrated optoelectronic devices with heaters for active temperature stabilization. Some embodiments pertain, in particular, to heterogeneous electro-absorption devices implemented in silicon photonics platforms.

BACKGROUND

Intensity modulation in telecommunications applications is often achieved with electro-absorption modulators (EAMs), which offer small size and low power and can be operated at high speed. EAMs generally operate based on the Franz-Keldysh effect, that is, a change in the absorption spectrum of a semiconductor via a change in the bandgap energy as caused by an applied electric field. Integrated EAMs are usually structured as vertical diode mesas with an electrical contact on the top for one polarity and electrical contacts on one or both sides of the mesa for the other polarity; having electrical contacts on both sides reduces the series resistance of the device, which is important for high-speed modulators. In many implementations, the intrinsic-type layer of the diode mesa includes a quantum well structure to exploit the quantum-confined Stark effect for high extinction ratios.

Band-edge effects such as the Franz-Keldysh effect and the quantum-confined Stark effect have a strong temperature and wavelength dependence. Therefore, it is generally desirable to keep the operating temperature of devices using these effects, such as EAMs, within a narrower range than the ambient temperature. In various photonic circuit designs, such temperature stabilization is achieved with a local heater placed in the vicinity of the diode mesa. In some photonics fabrication platforms, however, is not possible to have both a heater and an electrical contact running along the same side of a diode mesa, rendering it difficult to both minimize series resistance and locally regulate the operating temperature of the device. A device designer may, thus, have to choose between a fast device and a thermally regulated device.

DETAILED DESCRIPTION

Disclosed herein are device structures for temperature-regulated optoelectronic devices, including EAMs, that avoid the difficulties associated with a separate heater placed alongside the device by resistively heating portions of the device directly. Also described are methods of manufacturing and operating the disclosed device structures. In addition to avoiding the trade-off between device speed and temperature stability, the disclosed structures can simplify fabrication and improve the thermal efficiency of temperature regulation.

An optoelectronic device according to various (non-limiting) embodiments may include a heterogeneous optical waveguide structure on a semiconductor substrate, with a waveguide formed in a device layer of the substrate and a layered compound-semiconductor diode structure formed above the waveguide. The heterogeneous waveguide structure may, for instance, include a III-V diode above a silicon waveguide, but other material combinations are possible. The diode structure may include a doped bottom strip and, formed on top of the doped bottom strip, a layered mesa comprising an intrinsic-type layer and a doped top layer, with electrically conductive vias (or other types of electrical connections) contacting the top and bottom layers to apply a direct-current (DC) bias voltage and/or a radiofrequency (RF) voltage serving as a modulation signal across the diode. To heat the diode structure, a DC heater bias voltage may be applied between two electrically conductive vias both contacting the doped bottom layer, but on opposite sides of the diode, causing an electrical current to flow across and resistively heat the doped bottom layer, from which the generated heat then spreads into the adjacent intrinsic-type layer. Assuming a symmetric configuration of the two vias contacting the bottom layer, the effective voltage across the diode structure is, in this case, the potential difference between the average electric potential of the two vias and the electric potential of the via contacting the doped top layer of the mesa. Alternatively, the diode structure may be heated by applying a heater bias voltage between two electrically conductive vias contacting the device layer of the substrate on opposite respective sides of the heterogeneous waveguide, causing an electrical current to flow through and resistively heat the waveguide, which, in turn, heats the bottom and intrinsic-type layers of the diode thereabove. Beneficially, in this alternative configuration, separate and independently operated electronic circuits can be used for heating and modulation, respectively.

The above-described structures, along with various benefits, will be more readily understood from the following detailed description of the accompanying drawings.

Figure 1A:
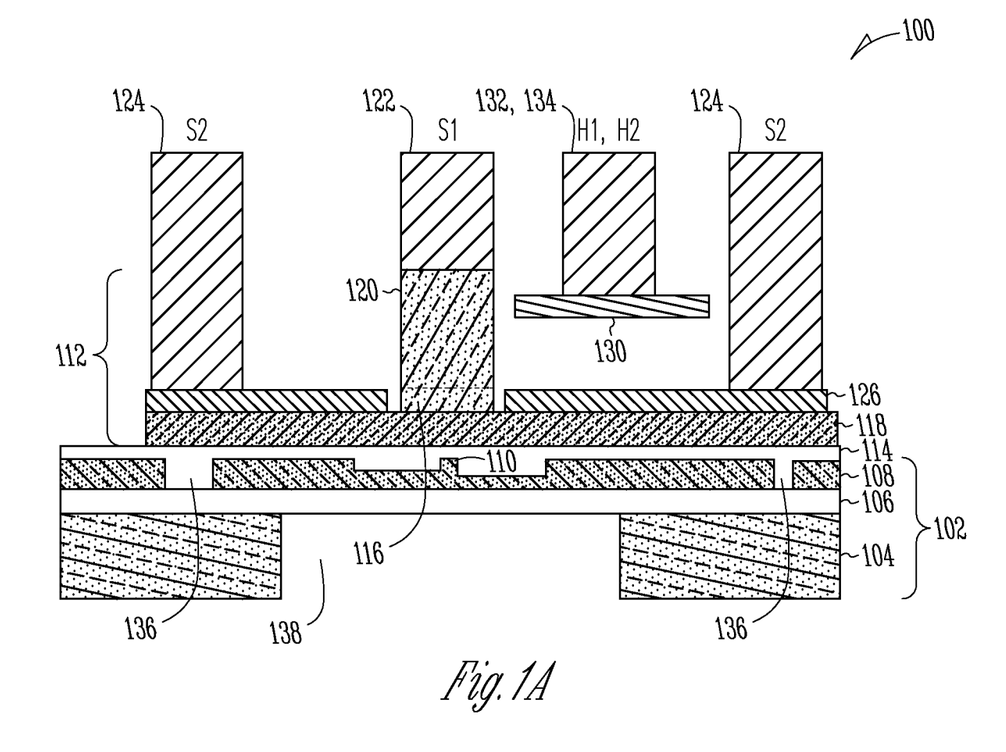
FIGS. 1A and 1B are schematic cross-sectional side and top views, respectively, of an example optoelectronic device with a heater placed alongside a heterogeneous waveguide of the device.
Figure 1B:
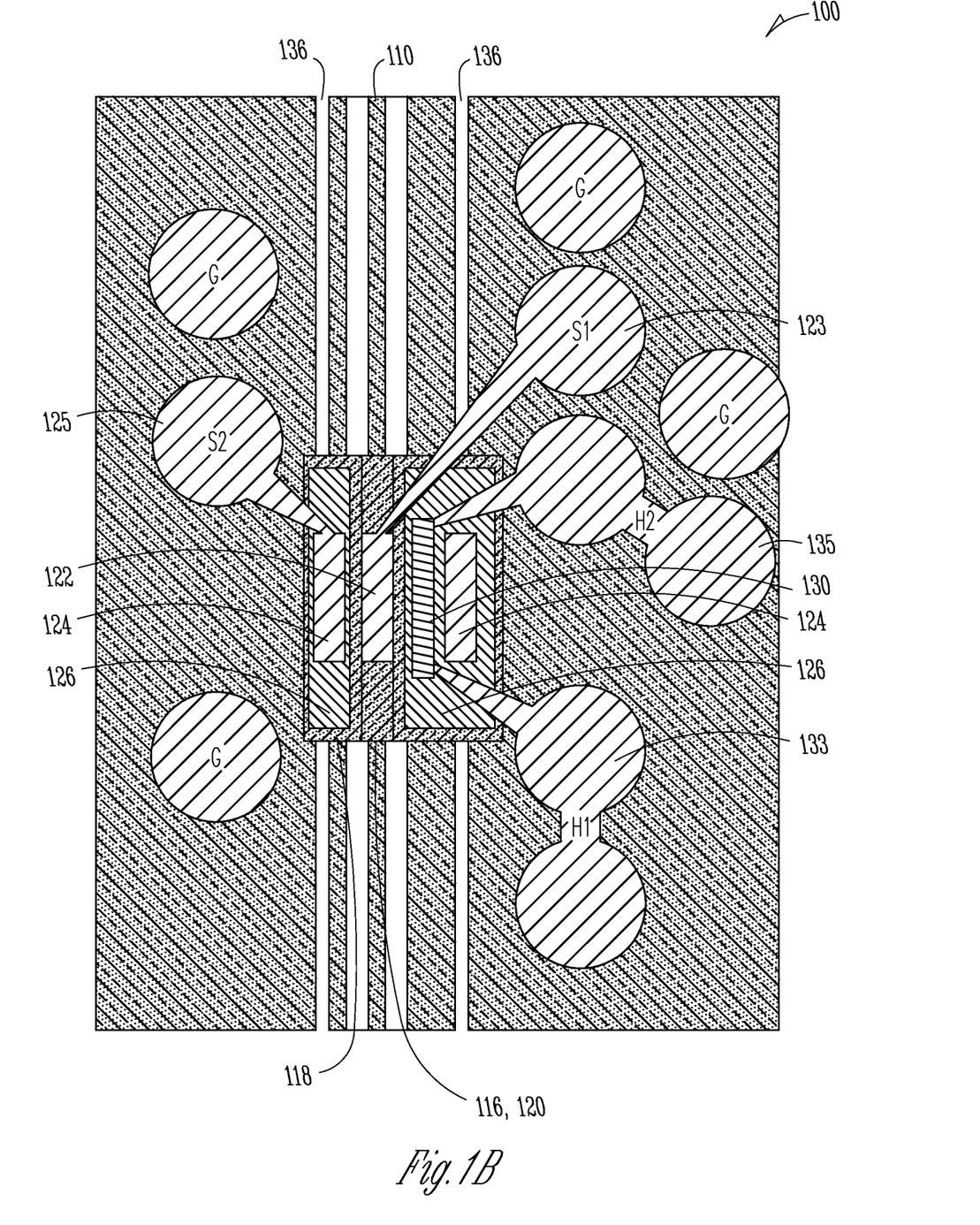

For context and comparison with various embodiments of the disclosed subject matter, FIGS. 1A and 1B illustrate, in cross-sectional side and top views, an example optoelectronic device 100 with a heater placed alongside a heterogeneous waveguide of the device 100. The device 100 is formed on a semiconductor-on-insulator (SOI) substrate 102 including a handle 104, electrically insulating (dielectric) layer 106, and top semiconductor device layer 108. In standard SOI substrates, the handle 104 and device layer 108 are usually both made of silicon, and the insulating layer 106 is a buried-oxide (BOX) layer. However, other material combinations are possible. Instead of silicon, the device layer 108 may, for instance, be a diamond or germanium layer. The device 100 includes a heterogeneous waveguide structure formed by a waveguide 110 (e.g., a rib waveguide) created in the device layer 108 in conjunction with a semiconductor-compound p-i-n diode structure 112 disposed thereabove, e.g., separated from the waveguide 110 and device layer 108 by a thin dielectric (e.g., oxide) layer 114. As can be seen in FIG. 1B, the diode structure 112 may extend along the axis of the waveguide 110 (in the direction of light propagation in the waveguide 110, which is the direction into the plane of FIG. 1A), and its length in that direction may be significantly greater than its width. In operation, light is coupled from the waveguide 110 into the diode structure 112 near one end of the overlap region, and back from the diode structure 112 into the waveguide 110 near the other end.

The diode structure 112 may be made of one or more III-V materials (such as, e.g., indium phosphide (InP) or gallium arsenide (GaAs)), II-VI materials (such as, e.g., cadmium selenide (CdSe) or zinc oxide (ZnO)), or other semiconductor materials made from two or more elements. The diode structure 112 is vertically layered, including an intrinsic-type (or simply "intrinsic") semiconductor layer 116 sandwiched between two doped bottom and top layers 118, 120. The bottom layer 118 is often n-doped and the top layer 120 p-doped, but the roles of the bottom and top layers 118, 120 as n-type and p-type layers of the p-i-n diode structure 112 may also be reversed. The intrinsic layer 116 may be made of a different semiconductor compound than the bottom and top layers 118, 120; for example, the diode structure 112 may include an intrinsic InAlGaAs layer in between doped InP layers. Further, the intrinsic layer 116 may be a bulk semiconductor layer, or may, alternatively, be composed of quantum wells, quantum dots, or quantum dashes. As shown, the bottom layer 118 may form a strip of material extending parallel to the waveguide 110 underneath the bottom layer 118 (see FIG. 1B), whereas the intrinsic and doped top layers 116, 120 may form a much narrower mesa (flat-top table-like structure) on top of the bottom layer (hereinafter also "bottom strip") 118. Although shown as equal in width, the intrinsic and doped top layers 116, 120 may alternatively differ in width, with a slightly wider or narrower intrinsic layer 116.

The device 100 further includes electrically conductive vias that provide electrical connections to the bottom and top layers 118, 120 for applying a voltage across the diode structure 112. The vias are generally implemented as vertical channels formed in a top cladding enclosing the diode structure 112, filled with a suitable metal (e.g., gold (Au), platinum (Pt), titanium (Ti), aluminum (Al) or zinc (Zn)) or other electrically conductive material. The top layer 120 may be directly contacted by a corresponding via 122 ("S1"). The bottom strip 118, on the other hand, is, in the implementation shown in FIG. 1A, contacted by respective vias 124 ("S2") indirectly via a thin metal layer 126 disposed on top of the bottom strip 118 surrounding the diode mesa. This added metal layer 126, which can get very close to the mesa, contributes to a low electrical resistance diode structure 112 while providing flexibility for placing the vias 124. An electrical voltage can be applied between the via 122 and the vias 124 using respective metal interconnects 123, 125 shown in FIG. 1B. The top view of FIG. 1B also shows interconnects to ground (labeled "G").

The device 100 is thermally regulated by a resistive heater 130 (e.g., made of a metal or metal alloy such as, e.g., tungsten, platinum, titanium-nitride, nickel-chrome, etc.) placed adjacent the (e.g., top layer 120 of the) diode mesa. Electrical connections for applying a heater bias voltage to the heater 130 are provided by electrically conductive (e.g., metal) vias 132, 134 and respective associated interconnects 133, 135 (the latter shown in FIG. 1B) (vias and interconnects collectively labeled "H1" and "H2"). As shown more clearly in FIG. 1B, the heater 130 may run alongside the diode mesa, parallel to the waveguide 110, and the associated vias 132, 134 may be spaced apart along that direction. The heater bias voltage can be adjusted as needed, e.g., based on measurements of the ambient temperature and/or the temperature of the diode structure itself, to heat the diode mesa to a temperature within a desired operating range; suitable sensors and circuitry for such temperature regulation are well-known to, and can be implemented straight-forwardly without undue experimentation by those of ordinary skill in the art. To minimize heat dissipation and thereby increase the efficiency of such temperature regulation, the heterogeneous waveguide structure may be thermally isolated by channels 136 (or "trenches") etched into the device layer 108 (e.g., all the way through to the insulating layer 106) on both sides of the waveguide 110 and diode mesa and/or by a back-etched region 138 in the handle 104 underneath the heterogeneous waveguide structure.

The device 100 can be made with standard semiconductor-fabrication techniques. Following lithographic patterning and etching of the substrate 102, bonding of a stack of compound-semiconductor material, and lithographic patterning and etching of the compound semiconductor to create the diode structure, the metal layer 126 is usually created by a lift-off process. That is, the heterogeneous structure is covered by a layer of resist, which is negatively patterned to expose only the regions on the bottom diode layer 118 where the metal layer 126 is to be formed; a metal layer is then deposited over the entire structure, and the patterned resist and metal thereabove are lifted off. This step adds cost and complexity to the fabrication process, and is, accordingly, not included in some semiconductor fabrication platforms. Without the metal layer 126, however, the resistance of the via 124 that contacts the bottom strip 118 of the diode on the same side of the diode mesa where the heater 130 is placed (e.g., in FIG. 1A, on the right side) can be significantly higher. In other words, to minimize the serial electrical resistance of the device 100, it is desirable to place the vias 124 as close to the diode mesa as possible, which, however, interferes with the placement of the heater 130, which, too, ought to be placed close to the mesa.

With reference now to FIGS. 2A-5, various embodiments of optoelectronic devices, otherwise similar to the device 100 of FIGS. 1A and 1B, that facilitate active temperature regulation without the need for a separate heater 130 will be described. These device structures differ from that of FIGS. 1A and 1B in the omission of the heater 130 and the extra metal layer 126, as well as in the number, placement, and/or electrical connections of the electrically conductive vias. The geometry and material choices of the substrate 102 and diode structure 112 of the above-described device 100, however, are equally applicable to the devices of FIGS. 2A-5, and associated reference numbers for various device components are, accordingly, maintained in the following description.

Figure 2A:
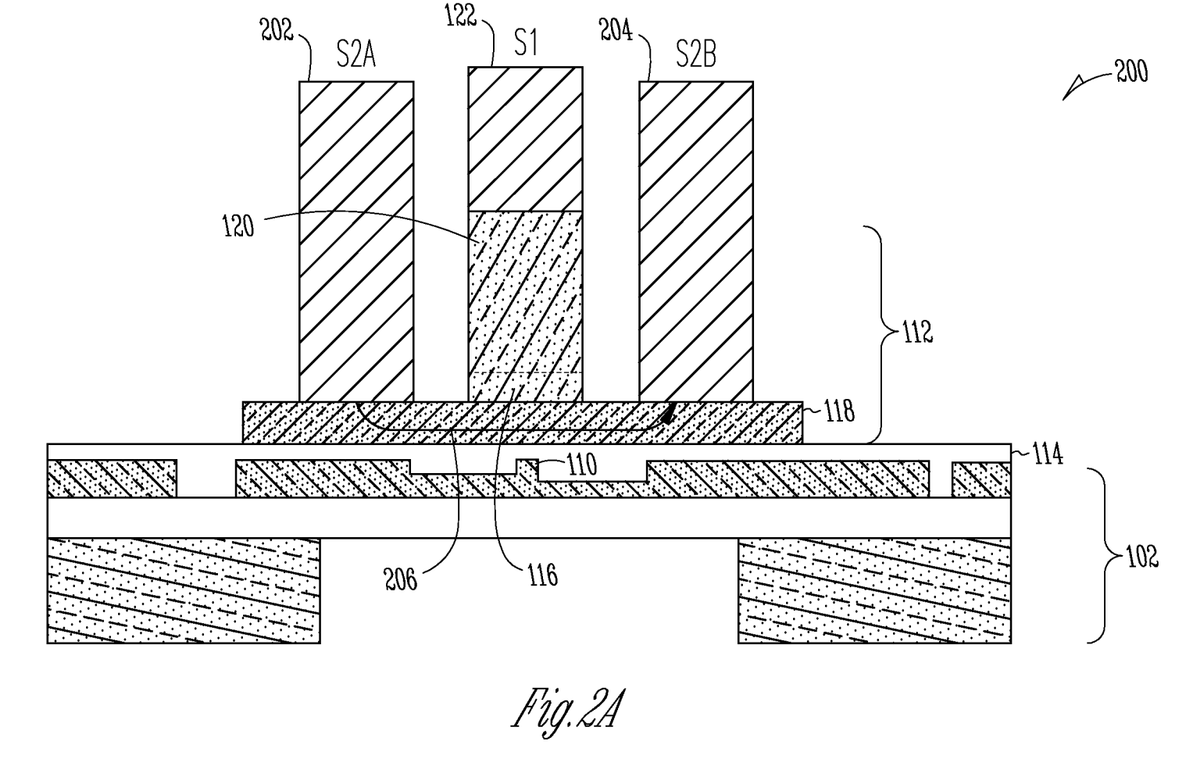
FIGS. 2A and 2B are a schematic cross-sectional side view and a top view, respectively, of an example three-contact optoelectronic device configured to directly heat a diode structure of the device by an electrical current therethrough, in accordance with various embodiments.
Figure 2B:
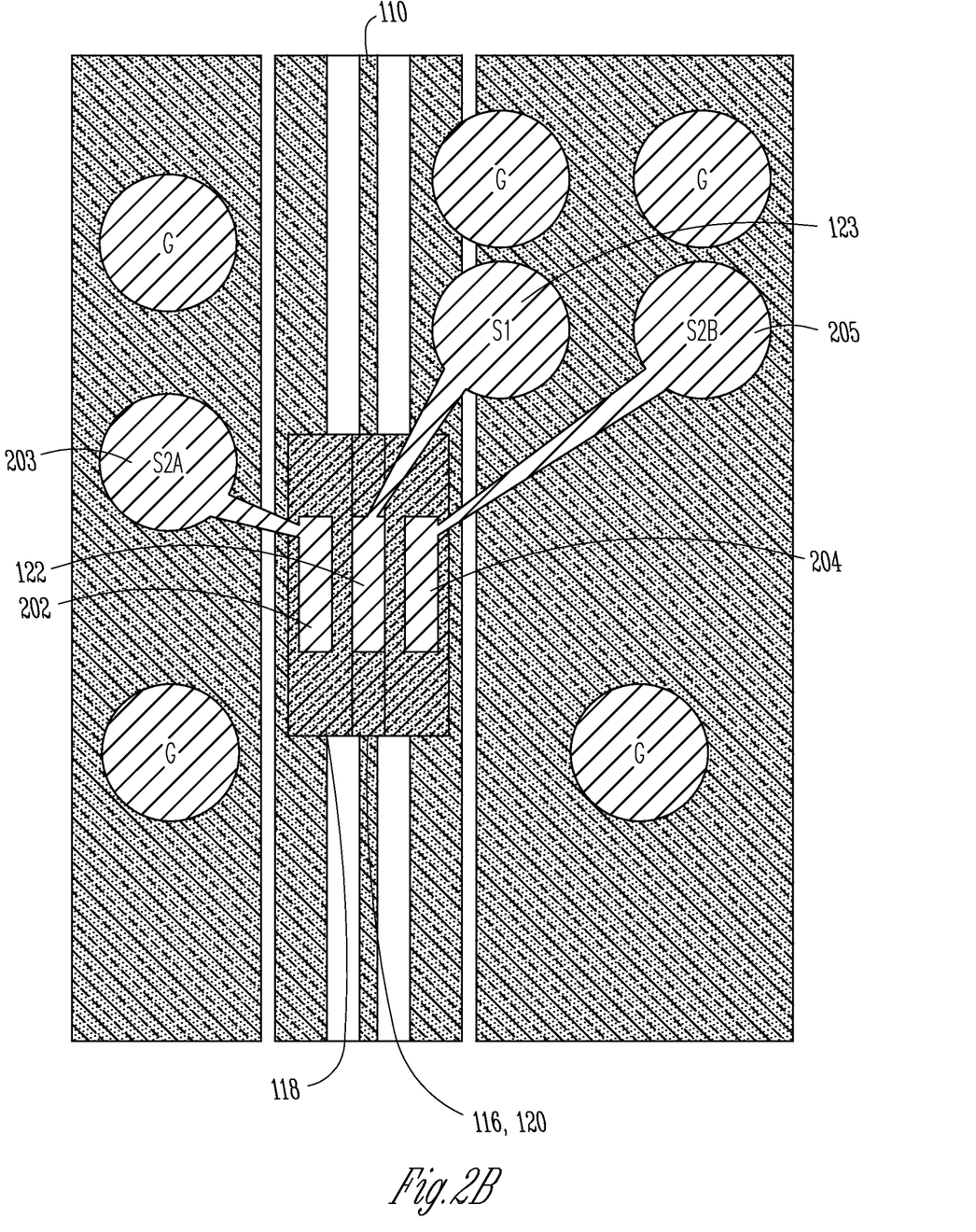

FIGS. 2A and 2B are schematic cross-sectional side and top views, respectively, of an example three-contact optoelectronic device 200 configured to directly heat a diode structure of the device by an electrical current therethrough, in accordance with various embodiments. The device 200 includes a waveguide 110 (e.g., a silicon waveguide) formed in an SOI substrate 102 and, disposed above the waveguide 110 and separated therefrom by a thin insulating layer 114, a compound-semiconductor diode structure 112 (e.g., a III-V structure) including a bottom diode strip 118 and, formed on top of the bottom diode strip 118, a layered diode mesa comprising an intrinsic layer 116 and a top diode layer 120. In operation, light is coupled from the waveguide 110 into the diode structure 112 thereabove, where the optical mode is guided at least in part (and usually primarily) in the intrinsic layer 116. The waveguide 110 and/or diode mesa may be tapered in width and/or height to improve the coupling efficiency. For instance, in an input region of the device 200 where light is coupled from the waveguide 110 into the diode structure 112, the waveguide 110 may taper down (i.e., decrease in width/height) and the diode mesa may taper up (i.e., increase in width/height) in the direction of light propagation. Conversely, in an output region of the device 200 where (e.g., modulated) light is coupled from the diode structure 112 back into the waveguide 110, the diode mesa may taper down while the waveguide 110 tapers up. In both regions, the tapers in the waveguide 110 and diode mesa may overlap (in a top view).

To achieve modulation of the light intensity, the absorption characteristics of the intrinsic layer 116 may be varied via an electrical field applied across the diode structure 112. For this purpose, the top diode layer 120 is contacted by an electrically conductive (e.g., metal) via 122 ("S1"), and the bottom diode strip 118 is contacted by electrically conductive (e.g., metal) vias 202, 204 ("S2A" and "S2B"), one placed on one side of the diode mesa and the other one placed on the other side of the diode mesa. By contacting the bottom diode strip 118 with two vias 202, 204 on opposite respective sides of the diode mesa and placing them close to the diode mesa, the electrical resistance of the device 200 can be reduced. The same purpose is further served by vias 122, 202, 204 that, as shown in FIG. 2B, run along at least a substantial portion of the length of the diode structure 112 (corresponding to the direction into the plane of FIG. 2A), which increases the contact area between the vias 122, 202, 204 and the respective layers 118, 120 of the diode structure 112.

The vias 122, 202, 204 allow a voltage to be applied between the top and bottom layers of the diode structure 112. In the depicted embodiment, the vias 202, 204 contacting the bottom strip 118 of the diode structure additionally serve to apply a voltage laterally (i.e., in a direction in-plane with the substrate 102 and perpendicular to the direction of light propagation) across the bottom diode strip 118 to cause an electrical current flow 206 through that layer 118 to heat the layer 118 and, by virtue of heat diffusion, the adjacent intrinsic layer 116. Accordingly, the vias 202, 204 are connected, through respective associated (e.g., metal) interconnects 203, 205 (shown in FIG. 2B), to two different electrical nodes. The via 122 contacting the top layer 120 is connected, through a respective interconnect 123, to a third electrical node.

Figure 3:
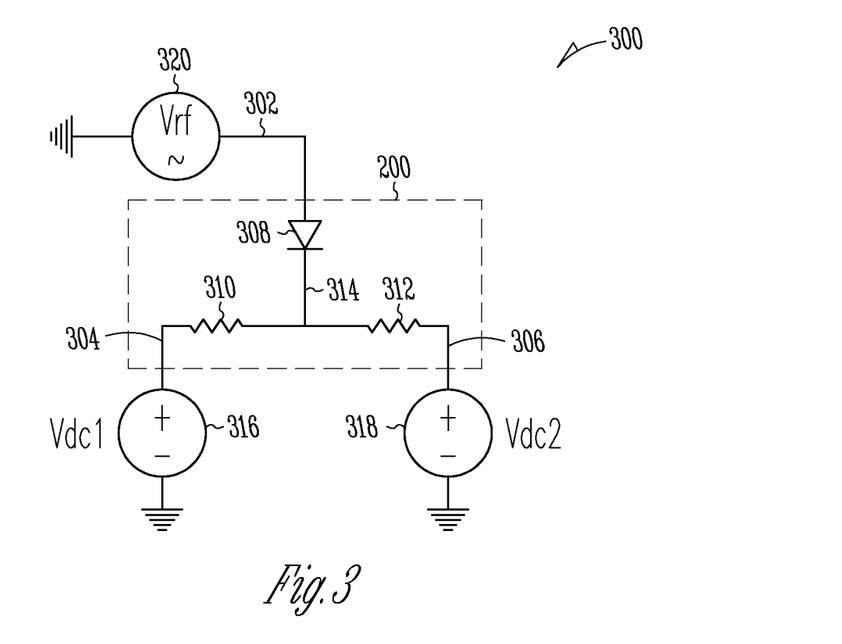
FIG. 3 is a circuit diagram of an example electrical circuit for operating the optoelectronic device of FIGS. 2A and 2B, in accordance with various embodiments.

FIG. 3 is a circuit diagram of an example electronic circuit 300 for operating the optoelectronic device 200 of FIGS. 2A and 2B, illustrating the three electrical nodes 302, 304, 306 to which the diode structure 112 (indicated with a dashed-line frame) of the device 200 is connected by means of the vias 122, 202, 204, respectively. In the circuit diagram, the diode structure 112 is modeled as an ideal diode 308 in conjunction with two resistors 310, 312 modeling the electrical resistance of the bottom diode strip 118. An electrical node 314 defined between the resistors 310, 312 is connected to the negative terminal of the diode 308, reflecting that, in the embodiment of FIGS. 2A-3, the electrically resistant bottom strip 118 is the n-type layer of the diode structure 112. Two DC voltage sources 316, 318 apply respective DC voltages $V_{DC1}$ and $V_{DC2}$ to nodes 304, 306, which are connected to the vias 202, 204 contacting the bottom diode strip 118. Thereby, a differential voltage $V_{DC1}-V_{DC2}$, constituting the heater bias voltage, is generated across the bottom diode strip 118, causing a current to flow through the resistors 310, 312 and resistively heat the bottom diode strip 118. Assuming that the bottom layer 118 and its associated vias 202, 204 are structurally symmetrical about the diode mesa, the two resistors 310, 312 have equal resistance, and the electrical potential at node 314 is the arithmetic average of $V_{DC1}$ and $V_{DC2}$. (Otherwise, in case of any asymmetry, the electrical potential at node 314 is some non-equally weighted average of $V_{DC1}$ and $V_{DC2}$.) The effective bias voltage applied across the diode 308 is the DC electrical potential difference between node 314 connected to the n-terminal and node 302 connected (through the via 122) to the p-terminal. As shown, the diode 308 is operated with a reverse bias, i.e., the n-type bottom layer 118 is connected to the positive terminals of the DC voltage sources 316, 318, whereas the p-type top layer 120 is connected, at node 302, to DC electrical ground. In addition to the DC bias voltage, an RF voltage $V_{RF}$ can be applied to the diode 308 as a modulation signal. As shown, the RF signal may be provided by an alternating-current (AC) source 320 connected to node 302 at the p-terminal; however, the RF signal may, in principle, also be applied to the n-terminal.

Figure 4A:
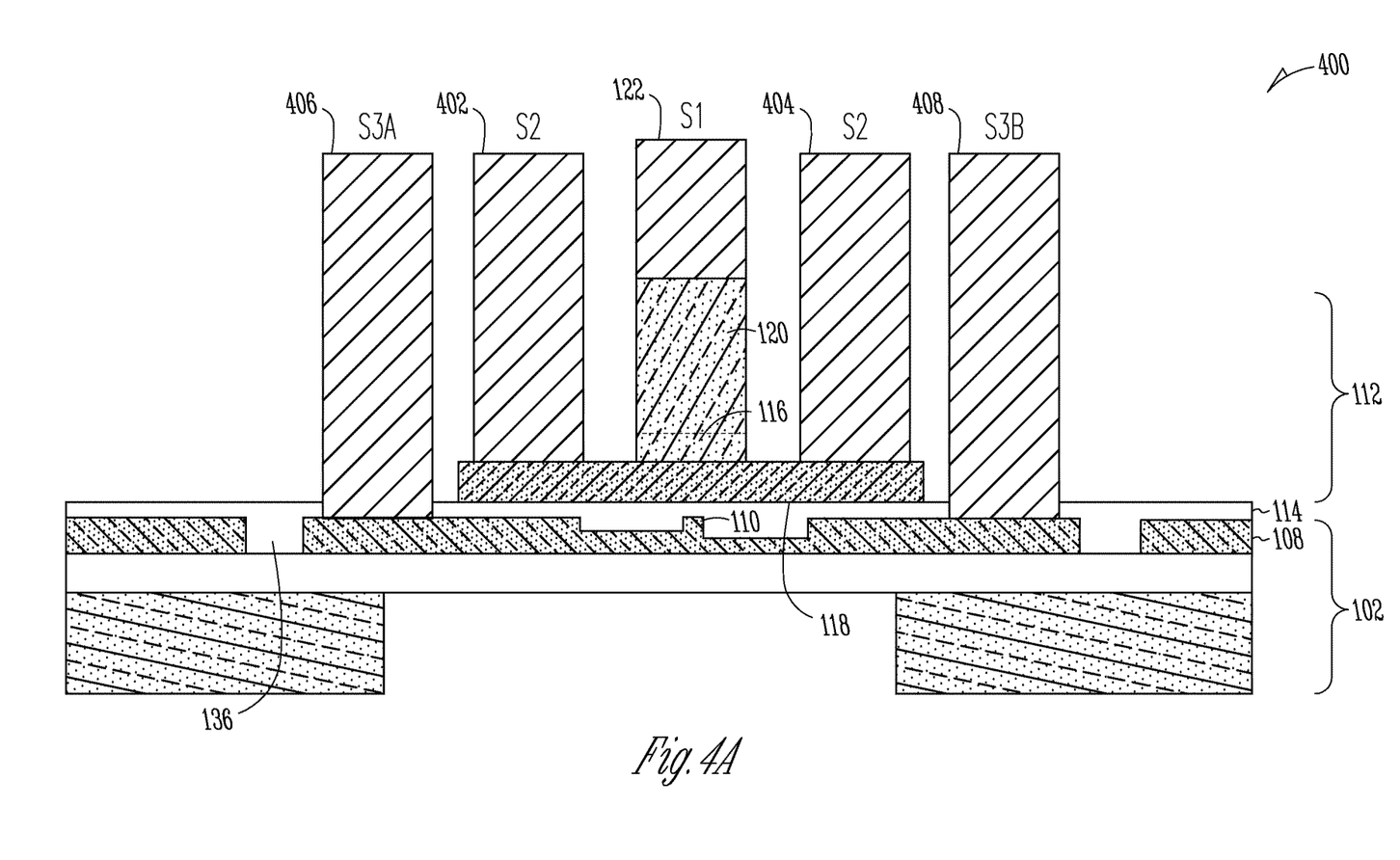
FIGS. 4A and 4B are a schematic cross-sectional side view and a top view, respectively, of an example four-contact optoelectronic device configured to directly heat a waveguide underneath the diode of a heterogeneous waveguide structure of the device by an electrical current through the waveguide, in accordance with various embodiments.
Figure 4B:
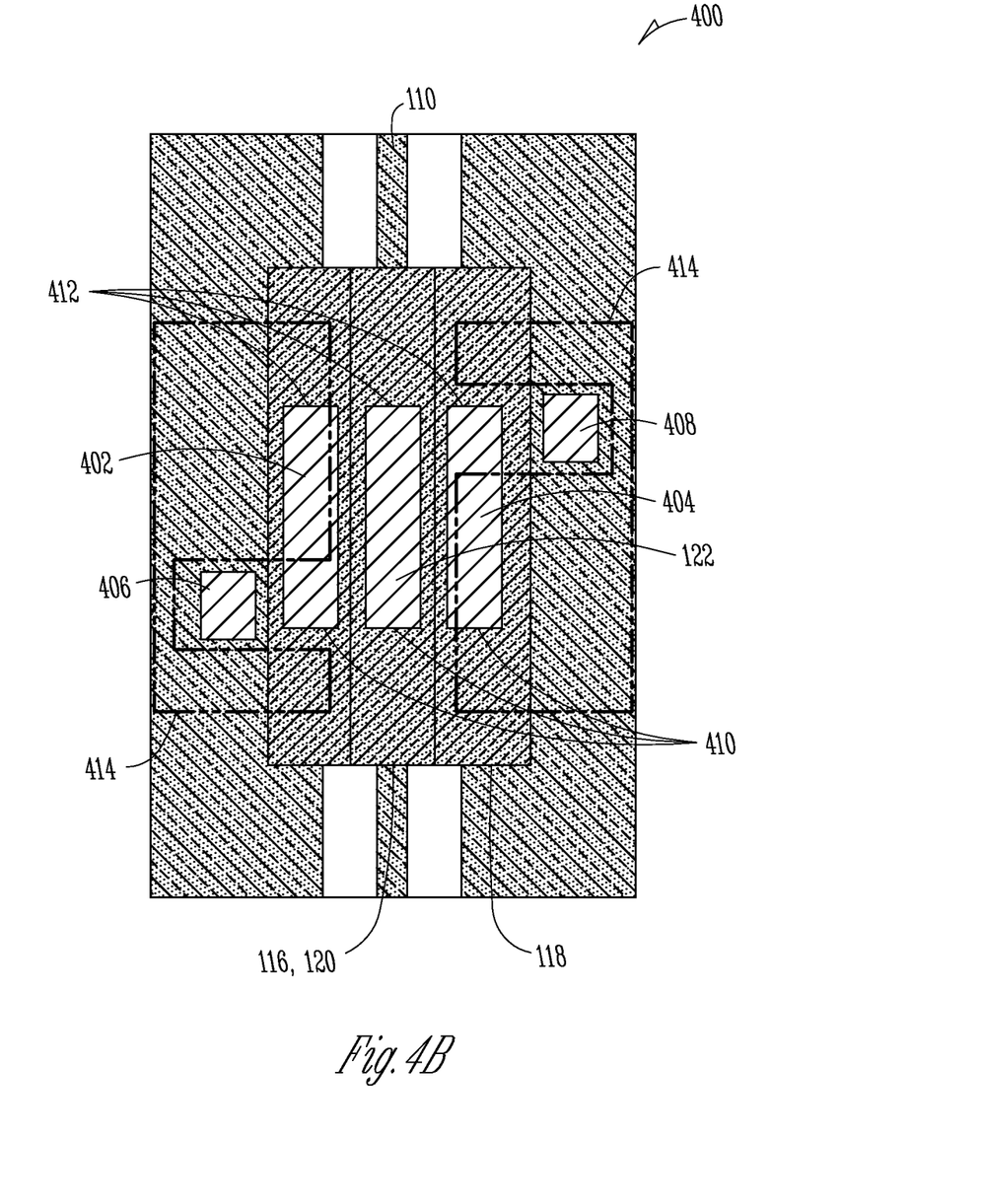
Figure 5:
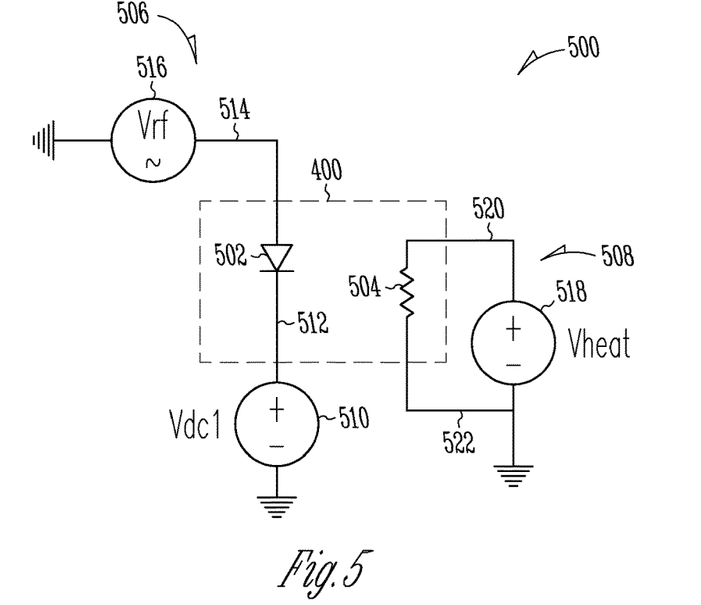
FIG. 5 is circuit diagram of an example electronic circuit configuration for operating the optoelectronic device of FIGS. 4A and 4B, in accordance with various embodiments.

Turning now to FIGS. 4A-5, an example four-contact optoelectronic device 400 configured to directly heat the waveguide underneath the diode within a heterogeneous waveguide structure, in accordance with various alternative embodiments, is illustrated. As shown in FIGS. 4A and 4B, the device 400 includes a heterogeneous waveguide structure, substantially similar to that of the above-described three-contact device 200, with a waveguide 110 formed in an SOI substrate 102 and, disposed above the silicon waveguide 110 and separated therefrom by a thin insulating layer 114, a diode structure 112 including a bottom diode strip 118 and a layered diode mesa having intrinsic and top diode layers 116, 120. Further, the device 400 includes an electrically conductive via 122 ("S1") contacting the top diode layer 120 and one or more electrically conductive vias 402, 404 ("S2") contacting the bottom diode layer 118. Unlike the vias 202, 204 of the three-contact device 200, which are connected to different electrical nodes 304, 306, the vias 402, 404 contacting the bottom diode layer 118 in the four-contact device may be electrically shorted together, i.e., connected to the same electrical node. It is also possible that only one of the vias 402, 404 is present in the device 400, although two vias 402, 404 placed on opposite sides of the diode mesa are beneficial in that they provide for lower electrical resistance, as discussed above. Using the vias 122 and 402, 404 that contact the top and bottom layers 120, 118, respectively, of the diode structure 112 (and the associated interconnects of vias 122, 402, 404, which are not shown), a reverse bias voltage and an RF signal voltage can be applied across the diode structure 112 to modulate an optical mode located at least in part (and usually primarily) in the intrinsic layer 116.

For thermal-regulation purposes, the device 400 includes additional vias 406, 408 that contact the device layer 108 of the substrate 102 on opposite respective sides of the diode structure 112. These additional vias 406, 408 are connected to different electrical nodes, allowing a voltage to be applied between the nodes to create a current flow through the device layer 108 underneath the diode structure and, in particular, through the waveguide 110. As shown in FIG. 4B, the vias 406, 408 may be spaced apart along the axis of the waveguide 110. (Spaced apart, the vias 406, 408 would not both be visible in the same cross-sectional view. FIG. 4A is, in this respect, a side view of the device 400, although other features, such as the waveguide 110, are shown in cross-section.) For example, the vias 406, 408 may be placed near the ends of the active region of the diode structure defined by the lateral ends 410, 412 of the vias 122, 402, 404, such that a heater current flows underneath substantially the entire active region (see FIG. 4B). In some embodiments, the device layer 108 is etched away in regions 414 (indicated by a phantom outline) adjacent and partially surrounding the vias 406, 408 to better channel the current flow underneath the active region and through the waveguide 110, and thereby increase heating efficiency. The heat resistively generated in the waveguide 110 diffuses through the bottom diode layer 118 and into the diode mesa (layers 116, 120), which is thereby also heated.

FIG. 5 illustrates an example electronic circuit configuration 500 for operating the optoelectronic device 400 of FIGS. 4A and 4B, in accordance with various embodiments. For purposes of depicting the electrical connections of the device 400, the diode structure 112 and waveguide 110 are represented by a diode 502 and an electrically separate resistor 504, respectively, which reflects the electrical insulation layer 114 between the waveguide 110 and diode structure 112. As can be seen, the circuit configuration 500 includes two separate electronic circuits 506, 508 for applying bias and RF signal voltages to the diode 502 and for applying a heater bias voltage across the resistor 504, respectively. In the diode-operating circuit 506, to reversely bias the diode 502, a positive voltage $V_{DC1}$ may be applied by a voltage source 510 at an electrical node 512 connected, via the electrically conductive via(s) 404, 402, to the bottom diode strip 118, which, in the depicted embodiments, provides the n-terminal of the diode 502. Alternatively, the reverse bias can be achieved by applying a negative voltage $-V_{DC1}$ at an electrical node 514 that is connected, through via 122, to the top diode layer 120, which provides the p-terminal. The RF signal voltage $V_{RF}$ may be provided by an AC source 516 at the node 514 connected to the top diode layer 120 (as shown), or at the node 512 connected to the bottom diode layer 118. In the heater circuit 508, a voltage source 518 applies a DC heater bias voltage $V_{heat}$ between nodes 520, 522 connected, through vias 406, 408, respectively, to the device layer 108 of the substrate. Beneficially, an electrical configuration involving separate circuits 506, 508, as facilitated by a device structure in which the waveguide 110, rather than the diode bottom strip 118, is resistively heated, can simplify the circuit design and provide greater flexibility in regulating the device temperature while optimizing the electro-absorption in the diode structure 112.

The above-described device structures can be modified in various ways while retaining salient structural features. For example, the vertical layered structure need not necessarily be a p-i-n diode structure, but may, e.g., include an intrinsic layer sandwiched in between two doped semiconductor layers of the same type (forming an n-i-n or p-i-p structure), or may, even more generally, include two electrically conducting layers separated by an insulating layer. Further, the overall device structure need not necessarily be heterogeneous. A mesa-type diode made from a compound semiconductor may, for example, be formed on a compound semiconductor (e.g., InP) substrate rather than a silicon-on-insulator substrate, resistive heating of the diode structure being enabled by electrical connections and circuitry as shown in FIGS. 2A-3. Also, in some embodiments, a waveguide underneath the diode structure may be omitted, and light may be guided to the diode structure via a compound semiconductor waveguide formed on top of the substrate, or coupled into the diode by other means.

Figure 6:
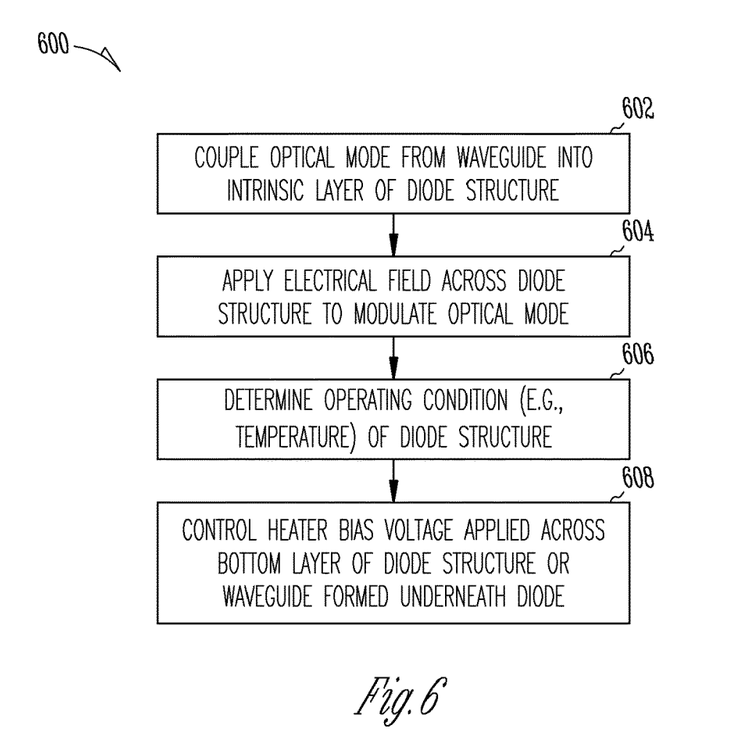
FIG. 6 is a flow chart illustrating a method of operation of an electro-absorption modulator in accordance with various embodiments.

Having described various structural embodiments of resistively heated optoelectronic devices, a method of operating such devices will now be described with reference to the flow chart shown in FIG. 6. The method 600 involves coupling an optical mode, e.g., received via a waveguide 110, into the intrinsic layer of a diode structure 112 of the device (act 602), and modulating the optical mode by applying an electric field across the diode structure 112 by means of a voltage applied to the electrical contacts (e.g., vias 122 and 202, 204 or 402, 404) of the top and bottom (e.g., p-type and n-type) diode layers 120, 118 (act 604). The voltage may include a DC component that creates a reverse bias across the diode structure 112 as well as an AC component (e.g., an RF voltage) that serves as the modulation signal. To stabilize the operation of the device, an operational condition, such as the temperature of the diode structure 112 (or, in particular, the intrinsic layer 116, where the optical mode is located) is determined (act 606). The temperature of the diode structure may be inferred, e.g., from a measurement of the ambient temperature, or may be directly measured, e.g., using one or more thermal sensors incorporated into the device in close proximity to the diode structure. The measured temperature (or other determined condition) may be used to control a heater bias voltage applied across the bottom layer of the diode (e.g., as shown in FIGS. 2A-3) or across the substrate device layer 108 (e.g., as shown in FIGS. 4A-5) (act 608). The device may include suitable control circuitry (which may form part of the integrated photonic circuit (PIC) or be provided, e.g., on a separate electronic control chip that is electrically connected to the PIC).

While the present disclosure focuses on light modulators, the described device structures are not limited to this particular application. More broadly, the disclosed structures may be integrated and provide benefits in any light-transmitting or light-receiving device that relies on a semiconductor band edge effect for light emission, absorption, or modulation. To employ an optoelectronic device as described herein as an RF receiver, for instance, a modulated optical signal may be coupled into a diode structure, and an RF voltage may be measured (rather than applied) through electrical connections with the top and bottom diode layers.

Figure 7:
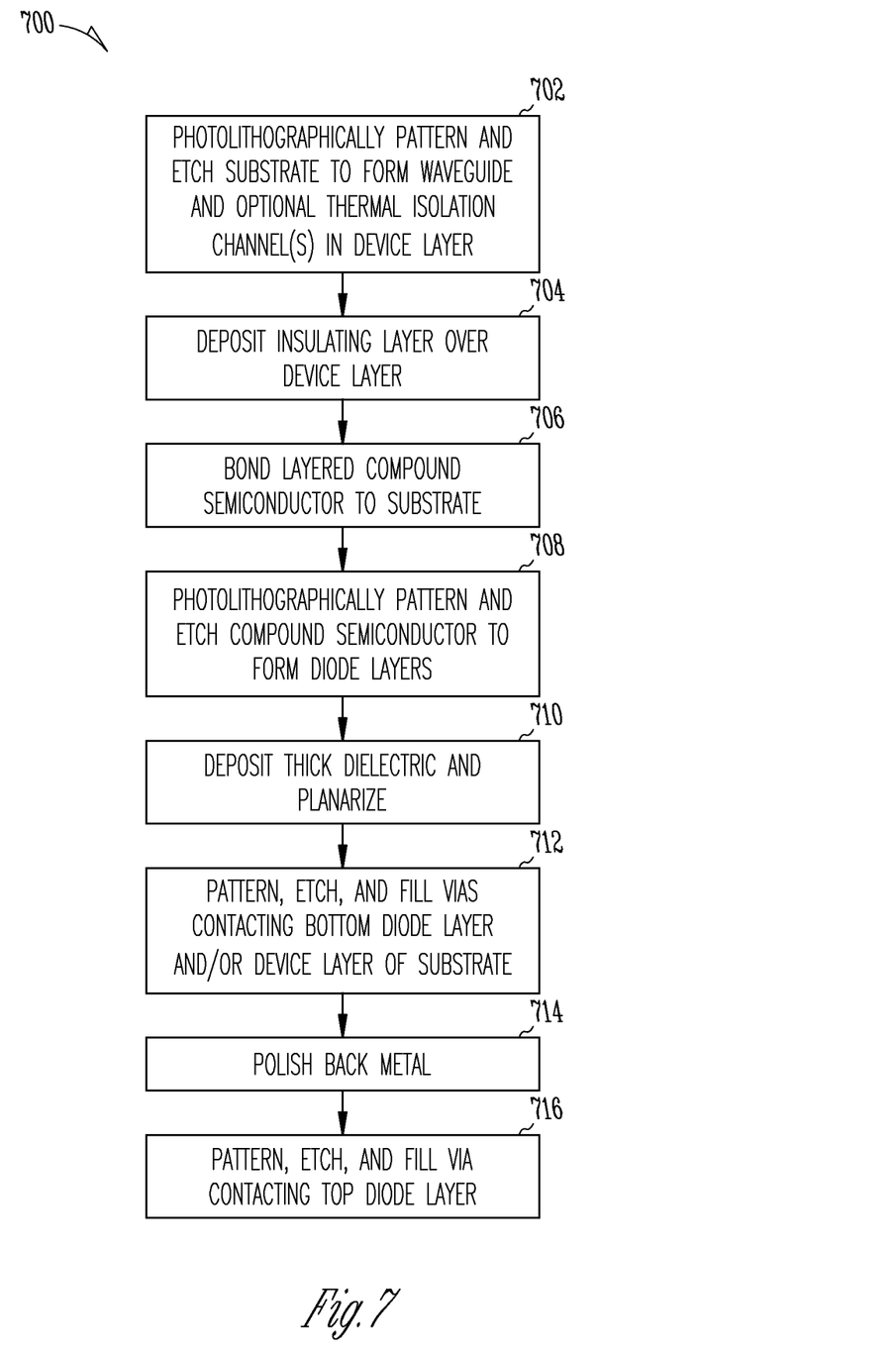
FIG. 7 is a flow chart illustrating a method of fabricating an electro-absorption modulator in accordance with various embodiments.

One of the benefits of the optoelectronic devices described herein is their amenability to fabrication with standard planar semiconductor processing flows in standard foundries. FIG. 7 is a flow chart illustrating an example method 700 of fabricating heterogeneous optoelectronic devices such as the devices 200, 400 described above with reference to FIGS. 2A-5. The method 700 involves photolithographically patterning and etching a substrate (e.g., an SOI substrate) to form optical device structures, such as waveguide 110 and, optionally, thermal isolation channels 136, in the device layer of the substrate 102 (act 702). An electrically insulating cladding layer may then be deposited on the device layer (act 704). A stack of compound semiconductor layers from which the diode structure is to be formed may be created separately and cut into blocks, and a layered compound semiconductor block is then bonded to the substrate (more specifically, the top dielectric layer of the substrate) (act 706). The compound semiconductor is photolithographically patterned and etched, in one or more steps, to form the diode layers (act 708). Next, in accordance with various embodiments, a thick layer of dielectric material is deposited over the entire structure (covering the diode structure) and planarized (act 710). Vias that provide the various electrical connections of the device are then formed in a series of steps. The vias may generally be all made from the same metal or other electrically conductive material. Alternatively, different metals/materials may be used for the different sets of vias (e.g., heater vias vs. diode vias).

Vias contacting the bottom diode layer and, if applicable, the device layer of the substrate are created by patterning and etching vertical channels into the thick dielectric, and filling the channels with a metal or other electrically conductive material (act 712). If the bottom diode layer is thin (as it is in many embodiments), vias contacting the bottom diode layer and vias contacting the substrate device layer are sufficiently similar in length to allow the respective channels to be etched simultaneously, using the bottom diode layer and device layer, respectively, as stop layers. Otherwise, vias contacting the top diode layer may be formed in a step separate from the formation of the vias contacting the device layer of the substrate. Once the vias contacting the device layer and bottom diode layer have been formed, the deposited metal is polished back (act 714), and the thereby exposed thick dielectric layer is patterned and etched to form a channel for the via contacting the top diode layer, which is likewise filled with metal or some other electrically conductive material (act 716). Alternatively, it is also possible that, in some embodiments, the thickness of the intrinsic and top diode layers, and thus the length difference between the vias contacting the top and bottom diode layers, is sufficiently small to facilitate creating all vias together in the same patterning/etching or filling steps.

The above-described fabrication steps may form part of a process flow for a PIC that also includes other optical components (beyond an electro-absorption modulator or similar optoelectronic device 200, 400), such as, e.g., one or more lasers, photodetectors, interferometers, optical amplifiers, optical switches, multiplexers, etc. Multiple PICs are usually created simultaneously on a single wafer, which can then be diced into individual chips (or dies) each corresponding to a single PIC. The PIC die may be flip-chip-bonded to an assembly-level substrate that provides electrical and/or optical connections for the PIC; the assembly-level substrate may also serve as a common substrate for the transceiver PIC and any additional photonic and/or electronic modules used in the same package.

Having described different aspects and features of optoelectronic device with heaters, the following numbered examples are provided as illustrative embodiments:

1. An integrated optoelectronic device comprising: a semiconductor substrate; a diode structure formed above the substrate, the diode structure comprising a bottom diode strip and, formed on top of the bottom diode strip, a layered diode mesa comprising an intrinsic-type layer and a top diode layer; a first electrical connection (e.g., electrically conductive via) contacting the top diode layer of the diode mesa, the first electrical connection connected to a first electrical node of an electronic circuit; and second and third electrical connections (e.g., electrically conductive vias) contacting the bottom diode strip on opposite respective sides of the diode mesa, the second electrical connection connected to a second electrical node of the electronic circuit and the third electrical connection connected to a third electrical node of the electronic circuit.

2. The device of example 1, wherein the electronic circuit is operatively to apply a heater bias voltage between the second and third nodes and a reverse bias voltage across the diode structure corresponding to a non-zero average of a voltage between the first node and the second node and a voltage between the first node and the third node.

3. The device of example 1 or example 2, wherein the electronic circuit is operatively to further apply an RF signal voltage at the first node.

4. The device of any of examples 1-3, wherein the substrate is a semiconductor-on-insulator (SOI) substrate, the device further comprising a waveguide formed in a device layer of the SOI substrate underneath the diode structure.

5. The device of example 4, wherein the diode structure is made of a compound semiconductor material, the waveguide and diode mesa collectively forming a heterogeneous optical waveguide structure.

6. The device of example 5, wherein the waveguide is made of silicon and the diode structure is made of a III-V material.

7. The device of any of examples 4-6, further comprising at least one of one or more thermal isolation channels formed in the device layer on both sides of the diode mesa or a thermally isolating etched region formed in a handle of the SOI substrate underneath the diode structure.

8. The device of any of examples 1-7, wherein the device is an electro-absorption modulator.

9. An integrated optoelectronic device comprising: a semiconductor-on-insulator (SOI) substrate; a heterogeneous optical waveguide structure comprising a waveguide formed in a device layer of the SOI substrate and a layered compound-semiconductor structure formed above the waveguide, the compound-semiconductor structure comprising a doped bottom strip and, formed on top of the doped bottom strip, a layered mesa comprising an intrinsic-type layer and a doped top layer; a first electrical connection (e.g., electrically conductive via) contacting the doped top layer of the layered mesa, the first electrical connection connected to a first electrical node; one or more second electrical connections (e.g., electrically conductive vias) contacting the doped bottom strip, the one or more second electrical connections connected to a second electrical node; and third and fourth electrical connections (e.g., electrically conductive vias) contacting the device layer of the SOI substrate on opposite respective sides of the waveguide, the third and fourth electrical connections being connected to third and fourth electrical nodes, respectively.

10. The device of example 9, wherein the layered compound-semiconductor structure is a diode structure.

11. The device of example 9 or example 10, wherein the first and second electrical nodes are part of a first electronic circuit that is operatively to apply a reverse bias voltage across the diode structure between the first and second nodes, and wherein the third and fourth electrical nodes are part of a second electronic circuit that is operatively to apply a heater bias voltage between the third and fourth nodes.

12. The device of any of examples 9-11, further comprising at least one of one or more thermal isolation channels formed in the device layer on both sides of the waveguide and mesa or a thermally isolating etched region formed in a handle of the SOI substrate underneath the heterogeneous optical waveguide structure.

13. The device of any of examples 9-12, wherein the waveguide is made of silicon and the diode structure is made of a III-V material.

14. The device of any of examples 9-13, wherein the third and fourth electrical connections are spaced apart along an axis of the waveguide.

15. The device of any of examples 9-14, wherein the device is an electro-absorption modulator.

16. A method comprising: coupling an optical mode into an intrinsic-type layer of a vertically layered diode structure formed above a substrate, the intrinsic-type layer being sandwiched between doped top and bottom layers of the diode structure; applying a reverse bias voltage across the diode structure between the top and bottom layers; applying a radio-frequency signal across the diode structure between the top and bottom layers to modulate an intensity of the optical mode; and applying a heater bias voltage between electrical connections (e.g., electrically conductive vias) that are placed on opposite respective sides of the diode structure in electrical contact with either the bottom layer or a device layer of the substrate to thereby resistively heat the bottom layer of the diode structure or a waveguide formed in the device layer underneath the diode structure, respectively.

17. The method of example 16, further comprising controlling the heater bias voltage to keep a temperature of the diode structure within a specified operating range.

18. The method of example 17, wherein the heater bias voltage is controlled based at least in part on at least one of an ambient temperature or a sensed temperature of the diode structure.

19. The method of any of examples 16-18, wherein the electrical connections placed on opposite respective sides of the diode structure contact the doped bottom layer of the diode structure, and wherein the reverse bias voltage is applied between an electrical connection contacting the doped top layer of the diode structure and the electrical connection contacting the doped bottom layer of the diode structure.

20. The method of any of examples 16-18, wherein the electrical connections placed on opposite respective sides of the diode structure contact the device layer of the substrate and are connected to electrical nodes of a first electronic circuit, and wherein the reverse bias voltage is applied between an electrical connection contacting the doped top layer of the diode structure and electrical connections contacting the doped bottom layer of the diode structure, the electrical connections contacting the doped top and bottom layers being connected to electrical nodes of a second electronic circuit that is separate from the first electronic circuit.

Although the inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

What is claimed is:

1. An integrated optoelectronic device comprising:
   a semiconductor substrate;
   a diode structure formed above the substrate, the diode structure comprising a bottom diode strip and, formed on top of the bottom diode strip, a layered diode mesa comprising an intrinsic-type layer and a top diode layer;
   a first electrical connection contacting the top diode layer of the diode mesa, the first electrical connection connected to a first electrical node of an electronic circuit; and
   second and third electrical connections contacting the bottom diode strip on opposite respective sides of the diode mesa, the second electrical connection connected to a second electrical node of the electronic circuit and the third electrical connection connected to a third electrical node of the electronic circuit.

2. The device of claim 1, wherein the electronic circuit is operatively to apply a heater bias voltage between the second and third nodes and a reverse bias voltage across the diode structure corresponding to a non-zero average of a voltage between the first node and the second node and a voltage between the first node and the third node.

3. The device of claim 1, wherein the electronic circuit is operatively to further apply an RF signal voltage at the first node.

4. The device of claim 1, wherein the substrate is a semiconductor-on-insulator (SOI) substrate, the device further comprising a waveguide formed in a device layer of the SOI substrate underneath the diode structure.

5. The device of claim 4, wherein the diode structure is made of a compound semiconductor material, the waveguide and diode mesa collectively forming a heterogeneous optical waveguide structure.

6. The device of claim 5, wherein the waveguide is made of silicon and the diode structure is made of a III-V material.

7. The device of claim 4, further comprising at least one of one or more thermal isolation channels formed in the device layer on both sides of the diode mesa or a thermally isolating etched region formed in a handle of the SOI substrate underneath the diode structure.

8. The device of claim 1, wherein the device is an electro-absorption modulator.

9. An integrated optoelectronic device comprising:
   a semiconductor-on-insulator (SOI) substrate;
   a heterogeneous optical waveguide structure comprising a waveguide formed in a device layer of the SOI substrate and a layered compound-semiconductor structure formed above the waveguide, the compound-semiconductor structure comprising a doped bottom strip and, formed on top of the doped bottom strip, a layered mesa comprising an intrinsic-type layer and a doped top layer;
   a first electrical connection contacting the doped top layer of the layered mesa, the first electrical connection connected to a first electrical node;
   one or more second electrical connections contacting the doped bottom strip, the one or more second electrical connections connected to a second electrical node; and
   third and fourth electrical connections contacting the device layer of the SOI substrate on opposite respective sides of the waveguide, the third and fourth electrical connections being connected to third and fourth electrical nodes, respectively.

10. The device of claim 9, wherein the layered compound-semiconductor structure is a diode structure.

11. The device of claim 10, wherein the first and second electrical nodes are part of a first electronic circuit that is operatively to apply a reverse bias voltage across the diode structure between the first and second nodes, and wherein the third and fourth electrical nodes are part of a second electronic circuit that is operatively to apply a heater bias voltage between the third and fourth nodes.

12. The device of claim 9, further comprising at least one of one or more thermal isolation channels formed in the device layer on both sides of the waveguide and mesa or a thermally isolating etched region formed in a handle of the SOI substrate underneath the heterogeneous optical waveguide structure.

13. The device of claim 9, wherein the waveguide is made of silicon and the diode structure is made of a III-V material.

14. The device of claim 9, wherein the third and fourth electrical connections are spaced apart along an axis of the waveguide.

15. The device of claim 9, wherein the device is an electro-absorption modulator.

* * * * *